Patented June 27, 1944

2,352,530

UNITED STATES PATENT OFFICE 2,352,530

REFRACTORY ZIRCONIA CASTING

Gordon S. Fulcher, Chevy Chase, Md., and Theodore E. Field, Louisville, Ky., assignors to Corhart Refractories Company, Louisville, Ky., a corporation of Delaware No Drawing. Application October 11, 1939,
Serial No. 299,036

7 Claims. (Cl. 106—57)

Refractories used in glass furnace construction for glasses which are very corrosive at their melting temperatures will contaminate the glass with cord from the refractory which may or may not be visible to the naked eye. Whether visible or not this cord has a different coefficient of thermal expansion than the body of the glass and introduces strains which weaken the thermal resistance. Refractories commonly used contain a considerable proportion of alumina which produces a cord of high coefficient of expansion which is especially troublesome in borosilicate glasses where the difference is emphasized by the low coefficient of expansion of the glass itself and where on the other hand superior resistance to thermal shock is being sought. It is the purpose of this invention to provide a refractory which minimizes these effects.

Harmful cord effects can be minimized in two ways. In the first way, if resistance to chemical attack can be increased, the amount of cord forming refractory dissolved into the glass is decreased. The process of melting and casting alumina-silica refractories, instead of burning them, disclosed by U. S. Patent #1,615,750 to Fulcher, tends to this end. In the second way, the strain produced by cord can be minimized if a sufficiently resistant composition which produces a cord with low coefficient of expansion can be found. We have discovered that certain compositions high in zirconia are satisfactory in this respect when melted and cast by the methods disclosed in U. S. #1,615,750.

The commercial sources of zirconia are a crude oxide sold as zirkite which contains considerable silica, iron oxide, and alumina, and, the silicate known as zircon which is relatively pure but has 35% $SiO_2$. Typical analyses of these are as follows:

|         | Zirkite | Zirkite | Zircon | Zircon |
|---------|---------|---------|--------|--------|
| $ZrO_2$   | 78.0    | 73.8    | 64.0   | 62.6   |
| $SiO_2$   | 10.89   | 15.95   | 35.00  | 35.00  |
| $Al_2O_3$ | 3.46    | 5.5     | .16    | .12    |
| $Fe_2O_3$ | 5.12    | 5.36    | .01    | .10    |
| $TiO_2$   | 1.40    | .84     | .30    | 1.75   |
| $CaO$     | .30     | .31     | .15    | .10    |
| $MgO$     | .10     | .00     | .15    | .05    |
| Alkali  | .22     | .56     | .02    | .00    |
| $P_2O_5$  | .36     | .68     | .15    | .20    |

While cast refractories in which zirconia is substituted for part of the alumina were disclosed in U. S. Patent #1,615,751 to Fulcher, complete substitution is not feasible from the standpoint of resistance and was not disclosed therein.

We have discovered that the relatively poor resistance to corrosion of 100% zirkite is apparently associated with a very poor glass phase resulting from the high iron oxide and titania. On the other hand zircon is recrystallized from a melt only on prolonged high temperature annealing, and the practical result of melting and casting zircon in the usual way is to produce the crystalline oxide and a silica glass saturated with zirconia. This glass is approximately 50% of the volume of the casting and since it has a softening point below the usual commercial glass melting temperatures, the castings are easily deformed and rapidly dissolved. While zircon has been used as major constituent in burned refractories, a commercially economical and satisfactory bonding for use in glass furnaces has not been achieved. Pure zirconia has likewise been used as an ingredient for burned refractories and in this case also a commercially practicable bond satisfactory both from the standpoint of chemical resistance and its ability to make the product non-porous has not been achieved. Thus it appears that while both zircon and pure zirconia have long been recognized as excellent refractories, available bonds have been either too low in resistance toward glass or required too high burning temperatures to be commercially practicable and such refractories are inherently less resistant than desirable because of their porosity which effectively increases the area exposed to flux action.

Zircon can, however, be treated by fusion with soda ash to produce a product with about 9.5% $SiO_2$ and up to 1.5% $Na_2O$ the balance being substantially zirconia, or, zircon can be smelted with coke in an electric furnace which results in reduction and volatilization of most of the silica to give a product about 95% $ZrO_2$ and 5% $SiO_2$. If the latter product is remelted without coke, the remaining silica is volatilized by the high temperature attained and a pig of substantially pure fused zirconia is obtained.

We have discovered that, with certain additions, we can prepare cast refractories from these materials which are not only free from alumina and therefore of its cord forming proclivities but are also significantly more resistant than earlier refractories so that a smaller amount is dissolved into the glass.

While it can be demonstrated that 100% zirconia is the most resistant to fluxing by glass, its high melting point of 2700° C. makes its use difficult in practical manufacture. We have discovered however that various fluxes can be added in certain proportions without decreasing the resistance below useful limits. The fluxes we prefer are alkalies, alkaline earths and silica since all of these are normal constituents of commercial glasses and do not produce color or gas by reaction.

We have found that as much as 15% of $K_2O$, $Na_2O$ or $Li_2O$ can be introduced, as a carbonate for example, into a pure zirconia cast refractory without lowering the resistance excessively. However, the volatility of the unreacted alkali in the batch is so high that a considerable excess must be used in the batch to obtain a given result, especially when the melt is small, and this obviously increases the cost unless means for recovering the condensed alkali are employed. For example in one small batch, 25% $Na_2O$ (44 parts dense $Na_2CO_3$) had to be added to give 18% $Na_2O$ in the castings. The loss is naturally lower with the higher percentages of flux. We normally prefer to use $Na_2CO_3$ since $Na_2O$ is the cheapest alkali and this salt is not as volatile as some. A suitable batch is the following when 40 and finer mesh $ZrO_2$ is used.

| Batch | Batch analysis | Casting analysis |
|---|---|---|
| 80 parts $ZrO_2$ | 80% $ZrO_2$ | 85% $ZrO_2$ |
| 35 parts $Na_2CO_3$ | 20% $Na_2O$ | 15% $Na_2O$ |

Lower alkali will give somewhat more resistance but is harder to cast and the percentage alkali loss is greater.

On the other hand the higher volatilization temperature of the oxides of alkaline earths, viz., beryllium, magnesium, calcium, strontium, and barium, permits rather complete retention in the product when one or more of these are used as fluxes for pure zirconia. As much as 25% can be added without decreasing the resistance excessively. CaO, SrO, and BaO form zirconates when too much is used and these phases are definitely inferior to baddeleyite in resistance. BaO produces the greatest fluxing for its weight, and compositions with this oxide are therefore easiest to cast. The alkaline earths can obviously be introduced in any form which yields the oxide by dissociation at elevated temperatures. With BaO for example one can use the monoxide, dioxide, carbonate, or sulphate conveniently. We prefer a batch as follows when using alkaline earths as fluxes:

| Batch | Batch analysis | Casting analysis |
|---|---|---|
| 85 parts $ZrO_2$ | 85% $ZrO_2$ | 85% $ZrO_2$ |
| 19 parts $BaCO_3$ | 15% BaO | 15% BaO |

Because of the extra melting operation required in manufacturing pure zirconia, it is significantly more expensive than the material produced from the first furnacing with about 5% $SiO_2$ with the zirconia. Where the utmost resistance is not required therefore we prefer for purposes of economy to utilize this crude oxide. Silica itself is a flux for zirconia and we have found it possible, although difficult, to remelt and cast this crude oxide to produce a very resistant casting consisting of course of crystalline $ZrO_2$ (baddeleyite and a silica glass saturated with zirconia. If the metal is poured as fast as accumulated, and the crown kept covered with fresh batch, not much silica is volatilized. As stated above, zircon with 35% silica is poor because of too much silica glass phase. The very good crude oxide can however be mixed with zircon to give a cheaper composition easier to cast and intermediate in silica and in resistance. We have discovered that silica can be increased to 20% before resistance is decreased excessively. The effect of increasing the silica with the usual casting practice is to increase the amount of silica glass saturated with zirconia, rather than to recrystallize zircon. As desirable batches, we may cite the following:

1

| Batch | Batch analysis ||
|---|---|---|
| | $ZrO_2$ | $SiO_2$ |
| | Percent | Percent |
| 100 crude $ZrO_2$ | 95 | 5 |

2

| Batch | Batch analysis ||
|---|---|---|
| | $ZrO_2$ | $SiO_2$ |
| | Percent | Percent |
| 50% crude $ZrO_2$ | 47.5 | 2.5 |
| 50% zircon | 32.0 | 17.5 |
| | 79.5 | 20.0 |

A greater fluxing action with smaller total amounts of flux and therefore with a larger percentage of the resistant crystalline $ZrO_2$ phase can be obtained by using two fluxes together. From the standpoint of cost it is advantageous to use as raw material the crude zirconium oxide containing some silica, and we prefer to combine this with alkalies or alkaline earths. In this case we obtain an alkali-silica or alkaline earth-silica glass phase saturated with zirconia, as matrix for the crystalline zirconia. From the standpoint of resistance to corrosion the proportions can naturally be varied from 20% $SiO_2$ to 15% alkali to 25% alkaline earth as given above for the individual limits. We prefer however to aim at 5% $SiO_2$ and 1 to 2% alkali or 5% alkaline earth for a very resistant refractory. When alkali is to be used it may be advantageous to use the oxide prepared chemically as opacifier from zircon since the residual alkali present does not easily volatilize. Satisfactory batches are as follows:

1

| Batch | Batch analysis ||| Casting analysis |||
|---|---|---|---|---|---|---|
| | $ZrO_2$ | $SiO_2$ | $Na_2O$ | $ZrO_2$ | $SiO_2$ | $Na_2O$ |
| 85.5 parts crude $ZrO_2$ | 81 | 4.3 | | | | |
| 27 parts dense $Na_2CO_3$ | | | 15 | | | |
| | 81 | 4.3 | 15 | 92 | 4 | 3.6 |

2

| Batch | Batch analysis ||| Casting analysis |||
|---|---|---|---|---|---|---|
| | $ZrO_2$ | $SiO_2$ | $Na_2O$ | $ZrO_2$ | $SiO_2$ | $Na_2O$ |
| 100 $ZrO_2$ opacifier | 89 | 9.5 | 1.5 | 89.9 | 9.40 | |

Among the alkaline earths, BaO is the most powerful flux and 5% is quite sufficient to permit ready casting of the crude zirconia. Satisfactory batches are the following:

1

| Batch | Batch analysis | | |
|---|---|---|---|
| | $ZrO_2$ | $SiO_2$ | BaO |
| 95 parts crude $ZrO_2$ | 90.2 | 4.8 | |
| 6.5 parts $BaCO_3$ | | | 5.0 |
| | 90.2 | 4.8 | 5.0 |

2

| Batch | Batch analysis | | | |
|---|---|---|---|---|
| | $ZrO_2$ | $SiO_2$ | $Na_2O$ | BaO |
| 95 parts $ZrO_2$ opacifier | 84.5 | 9.0 | 1.43 | |
| 6.5 parts $BaCO_3$ | | | | 5.0 |
| | 84.5 | 9.0 | 1.43 | 5.0 |

With more silica, less other flux is required for the same ease of melting, or if the additional fluxes are held constant and silica increased, the ease of casting is increased but the resistance to attack is decreased. The most economical batch obviously depends upon the degree of resistance required and the tolerance permissible for dissolved refractory.

In the following claims we use the term "heat cast" to identify a refractory which forms on the solidification of molten material, thereby distinguishing it from a wet cast product.

What we claim is:

1. A heat cast refractory for contact with molten glass consisting essentially of zirconia and at least one of the alkalies $Li_2O$, $Na_2O$ and $K_2O$ in which the total alkali is less than 15% by weight by chemical analysis, and substantially free from alumina.

2. A heat cast refractory for contact with molten glass consisting essentially of zirconia and silica in which the silica is less than 20% by weight by chemical analysis, and substantially free from alumina.

3. A heat cast refractory for contact with molten glass consisting essentially of zirconia, silica and at least one of the alkalies $Li_2O$, $Na_2O$ and $K_2O$ in which the silica is not more than 20% nor the total alkalies more than 15% by weight by chemical analysis and which is substantially free from alumina.

4. A heat cast refractory for contact with molten glass consisting essentially of zirconia, silica and at least one of the alkaline earth oxides BeO, MgO, CaO, SrR and BaO in which the silica is not more than 20% nor the total alkaline earths more than 25% by weight by chemical analysis and which is substantially free from alumina.

5. A heat cast refractory for contact with molten glass consisting essentially of zirconia and silica in which the silica is less than 5% by weight by chemical analysis, and substantially free from alumina.

6. A heat cast refractory for contact with molten glass consisting essentially of zirconia, silica and at least one of the alkalies $Li_2O$, $Na_2O$ and $K_2O$ in which the silica is not more than 5% nor the total alkalies more than 15% by weight by chemical analysis and which is substantially free from alumina.

7. A heat cast refractory for contact with molten glass consisting essentially of zirconia, silica and at least one of the alkaline earth oxides BeO, MgO, CaO, SrO and BaO in which the silica is not more than 5% nor the total alkaline earths less than 5% or more than 25% by weight by chemical analysis and which is substantially free from alumina.

GORDON S. FULCHER.
THEODORE E. FIELD.